United States Patent
Newman et al.

(10) Patent No.: US 6,964,213 B2
(45) Date of Patent: Nov. 15, 2005

(54) LOW POWER, HIGH TORQUE ACTUATOR RETENTION

(75) Inventors: Thomas Wayne Newman, Flint, MI (US); Thomas E. Gyoergy, Clarkston, MI (US); Jeffrey Jean Stege, Linden, MI (US); Chris D. Robinson, Grand Blanc, MI (US); Lawrence Dean Hazelton, Goodrich, MI (US)

(73) Assignee: Delphi Technologies, Inc., Troy, MI (US)

( * ) Notice: Subject to any disclaimer, the term of this patent is extended or adjusted under 35 U.S.C. 154(b) by 302 days.

(21) Appl. No.: 10/396,060

(22) Filed: Mar. 25, 2003

(65) Prior Publication Data

US 2004/0187620 A1    Sep. 30, 2004

(51) Int. Cl.⁷ ............................................. F16H 57/10
(52) U.S. Cl. ..................... 74/530; 74/816; 74/813 C; 74/813 L; 192/148
(58) Field of Search .............................. 74/411.5, 530, 74/813 L, 813 C, 816; 192/148, 215

(56) References Cited

U.S. PATENT DOCUMENTS

| | | | | |
|---|---|---|---|---|
| 804,919 A | * | 11/1905 | Barnes | 408/90 |
| 2,164,396 A | * | 7/1939 | Foster et al. | 74/819 |
| 2,786,360 A | * | 3/1957 | Cameron | 74/84 R |
| 2,873,822 A | * | 2/1959 | Sloan | 188/68 |
| 2,963,924 A | * | 12/1960 | Anderson | 74/818 |
| 3,048,059 A | * | 8/1962 | Cross | 74/819 |
| 3,150,545 A | * | 9/1964 | Raehrs | 74/817 |
| 3,227,437 A | * | 1/1966 | Osborn, Jr. | 269/63 |
| 3,485,115 A | * | 12/1969 | Gates | 74/815 |
| 3,724,291 A | * | 4/1973 | Goebel | 74/815 |
| 3,899,852 A | * | 8/1975 | Batson | 451/359 |
| 4,979,855 A | * | 12/1990 | Babel | 409/218 |
| 5,827,149 A | * | 10/1998 | Sponable | 477/92 |
| 6,199,442 B1 | * | 3/2001 | Bauer et al. | 74/411.5 |
| 6,422,188 B2 | | 7/2002 | Pierik | |
| 6,619,460 B1 | * | 9/2003 | Carlsson et al. | 192/219.5 |

* cited by examiner

Primary Examiner—William C Joyce
(74) Attorney, Agent, or Firm—Jimmy L. Funke

(57) ABSTRACT

A smart actuator and method includes an actuating device adapted to deliver a selected driving torque to a geartrain that is coupled to an output shaft and adapted to selectively convey the driving torque from the actuating device to the output shaft to achieve a selected shaft position. At least one logic and control device operates the various aspects of the smart actuator. The geartrain includes at least one locking gear including locking features defining a plurality of gear positions. A position lock solenoid is adapted to engage the locking gear at a selected gear position once the geartrain has achieved the selected shaft position on the output shaft. The position lock solenoid then holds the gear at the selected gear position. The actuating device is shut off after the position lock solenoid has engaged the locking gear thereby achieving and holding a high torque without driving a lot of current.

13 Claims, 5 Drawing Sheets

LOW POWER, HIGH TORQUE ACTUATOR RETENTION

TECHNICAL FIELD

The present invention relates to an actuator. More particularly, the present invention relates to a smart actuator and method for providing high peak and hold torque for various engine mounted applications.

BACKGROUND OF THE INVENTION

It is known in a power train for a motor vehicle to have a prime mover (such as an internal combustion engine), a transmission including a gear train which transmits torque to the wheels of the vehicle, a torque transmitting system (such as a clutch) between the engine and the gear train, a means for operating the gear train such as an electronic control unit, and one or more actuators which operate the clutch and/or the gear train in response to signals from the control unit.

It is further known to operate an automated gear train by a control unit which receives signals from one or more sensors, electronic circuits and/or other monitoring means and transmits signals to one or more actuators which directly actuate or operate the gear train to select a particular gear ratio and/or to shift into a selected gear. The same actuator or additional actuators can be used as a means for automatically selecting the torque to be transmitted by an automated clutch or other automated torque transmitting system between a prime mover and the input element of the gearbox in the power train. The connection between one or more actuators and the actuated part(s) of a gear train or clutch can include one or more driving units for selecting a given gear ratio and shifting into the selected gear.

There is a need in the art for actuators for various engine mounted applications that meet high peak and hold torque requirements. It is known to achieve high peak torque by providing various motor and gear train enhancements that also meet power consumption, overall size, speed and back drive requirements. While there are various known methods for achieving high peak torque, holding the high peak torque level is much more difficult.

One known method to hold high torque is to hold the high torque with a high current level. This method assumes using an actuator that meets the peak torque, size, speed, and back-drivability requirements. However, the actuator will not survive for the duration of the hold time requirement (up to ten minutes). Further, the estimated 6 to 8 amperes of current required will overheat the motor coils or electronics.

Another known method to provide high hold torque is to increase the torque capability by increasing the motor size. This approach reduces the hold current to a manageable level, but increases the size and mass of the motor beyond overall package requirements. An additional disadvantage is that, generally, motor cost increases with motor size. As motor size increases, motor current draw also increases. Such increased current draw causes thermal problems for the actuator, for the drive electronics, and for the motor. This approach further provides the disadvantage of reduced output shaft speed.

Yet another known method to hold high torque is to increase the gear ratio. While increasing the gear ratio reduces the hold current to a manageable level, such an approach presents several disadvantages. First, this approach results in reduced output shaft speed. Second, known spur gear designs must increase in size beyond package limits and further have reduced back-drivability. Third, known worm gear designs are not back drivable.

What is needed in the art is an apparatus and method to achieve and hold a high torque level while maintaining acceptable power levels, size, speed, and back drive ability targets.

SUMMARY OF THE INVENTION

The invention is a smart actuator comprising:

an actuating device adapted to deliver a selected driving torque to a gear train;

the gear train being coupled to an output shaft and adapted to selectively convey the driving torque from the actuating device to the output shaft to achieve a selected shaft position on the output shaft;

the gear train comprising at least one locking gear including a plurality of locking features defining a plurality of selectively engageable gear positions;

a position lock solenoid adapted to engage the at least one locking gear in a selected gear position once the gear train has achieved the selected shaft position on the output shaft and to hold the gear at the selected gear position thereby holding the selected shaft position;

wherein the actuating device is shut off after the position lock solenoid has engaged the locking gear; and at least one logic and control device for operating the various aspects of the smart actuator.

The at least one logic and control device includes an on-board control unit for controlling locking of the gear via the position lock solenoid at the selected detent position; shutting off the electric actuator upon locking of the gear and holding the gear position via the position lock solenoid for a specified time; and disengaging the position lock solenoid from the locking gear. The at least one logic and control device is adapted to receive input and convey output to an engine control unit (ECU) or other intelligent device.

The invention further includes a method employing a smart actuator for transmitting and holding a torque level comprising:

delivering a selected driving torque to a gear train via an actuating device, said gear train being coupled to an output shaft;

selectively conveying the driving torque delivered to the gear train to an output shaft to achieve a selected position on the output shaft;

said gear train comprising at least one locking gear including a plurality of locking features defining a plurality of selectively engageable gear positions;

selectively activating a position lock solenoid adapted to engage the locking gear in a selected locking position on the gear once the gear train has achieved the selected position on the output shaft and holding the gear in the locked position for a selected period of time;

shutting off the actuating device;

selectively disengaging the position lock solenoid from the gear; and employing at least one logic and control device for operating the various aspects of the smart actuator.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Figure 1:
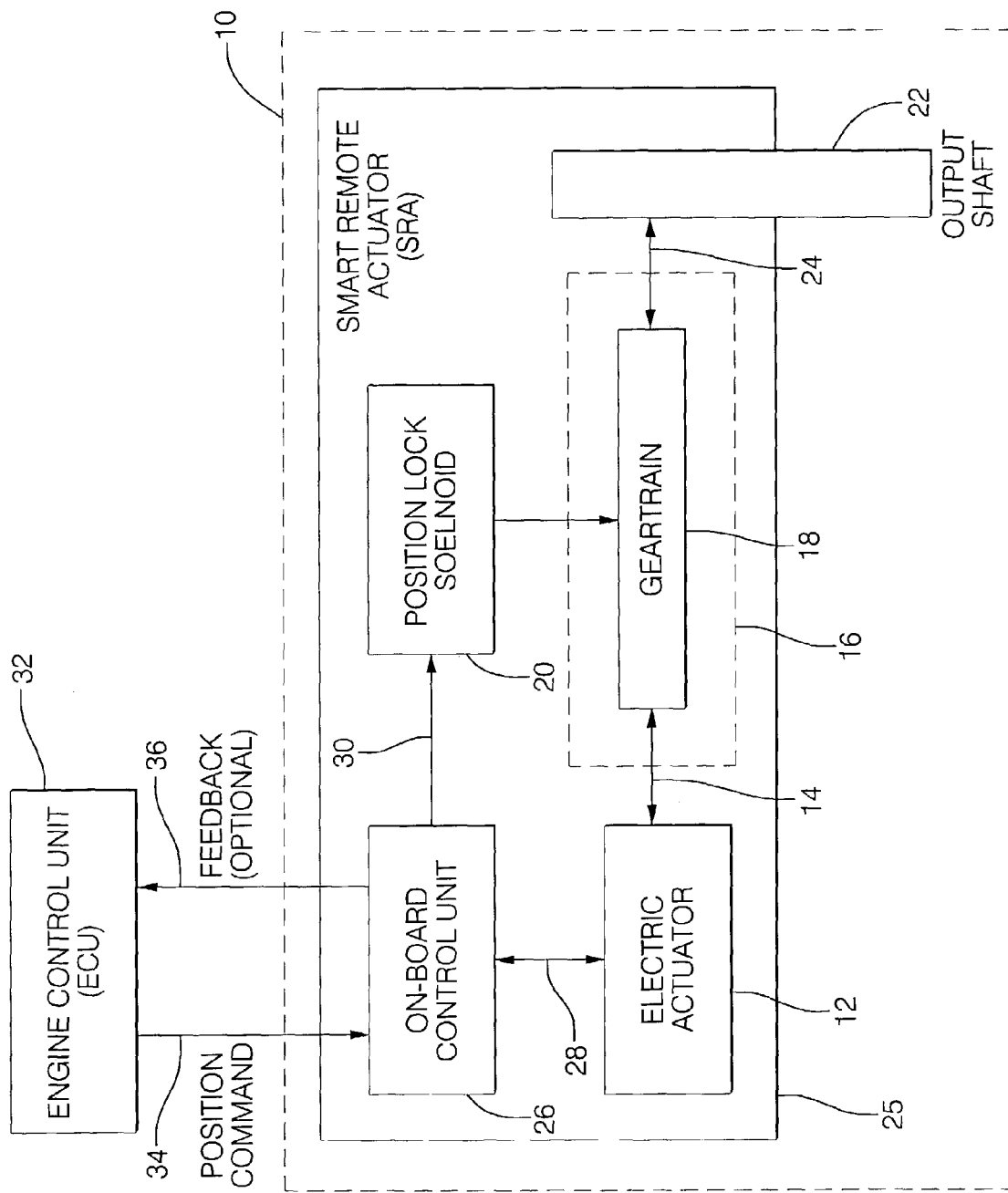
FIG. 1 is a schematic block diagram of a preferred embodiment of the present invention.
Figure 2:
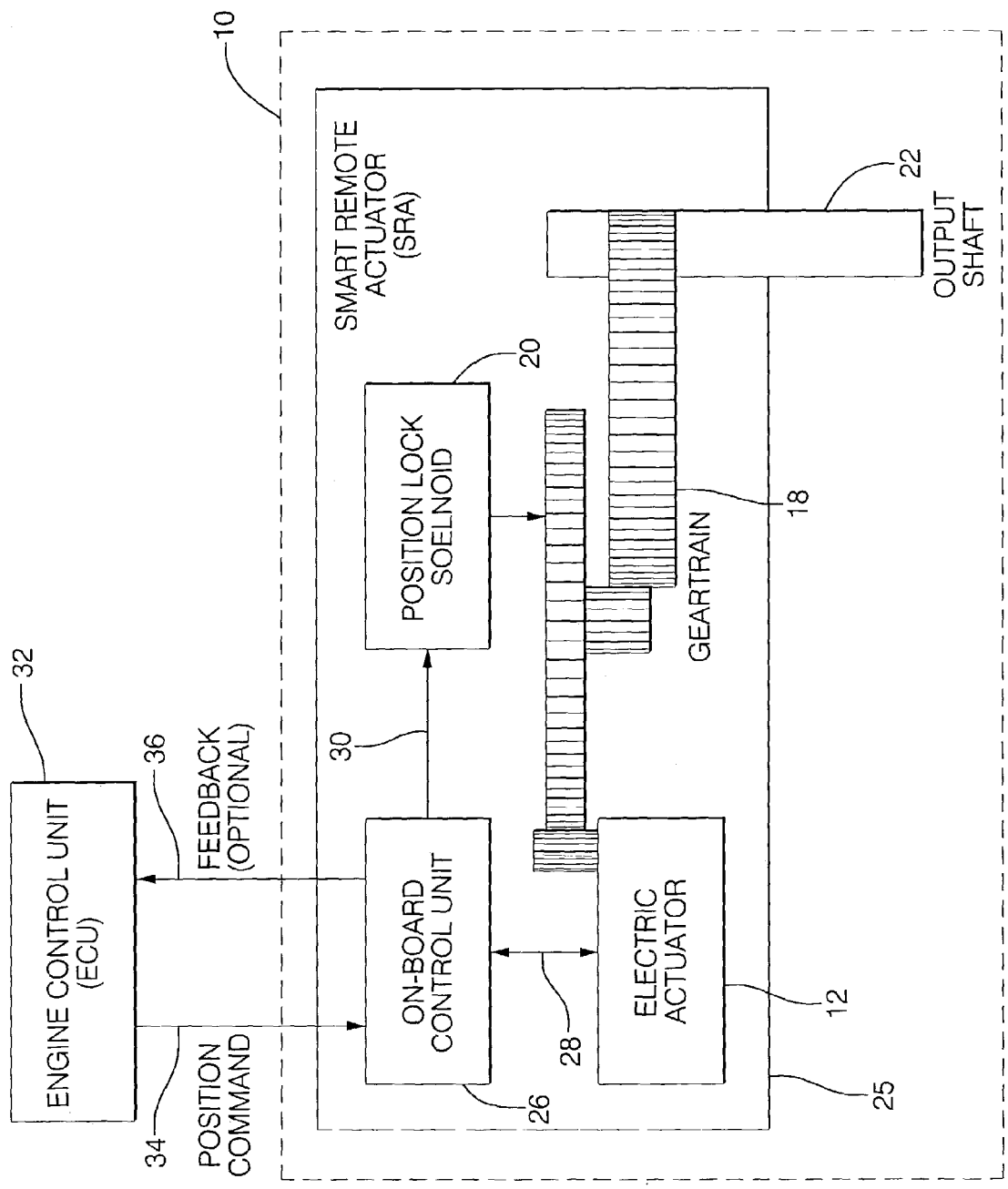
FIG. 2 is another schematic block diagram of the preferred embodiment of the present invention.

FIGS. 1 and 2 are schematic block diagrams of one possible embodiment of the present invention. In FIGS. 1 and 2, an apparatus 10 comprising a smart actuator is illustrated. The smart actuator 10 is preferably for use in a variety of engine mounted applications including automotive electronic transmission systems, automotive braking systems, and even non-automotive applications. The smart actuator 10 is illustrated as including an actuating device 12 such as an electric actuator 12 (drive motor) connected such as by a coupler/shaft 14 to a transmission 16 including a gear train 18. Gear train 18 is connected to an output shaft 22 of a drive member by a coupler/shaft 24. The position lock solenoid 20 and central gear shaft 23 (around which gear 44 rotates, shown in FIGS. 3–5) are secured to the actuator housing 25. The position lock solenoid 20 is normally not connected to gear train 18, but contacts gear train 18 when engaged in the lock position.

A logic/control device 26 comprising an on-board control unit is in electrical communication with electric actuator 12 and position lock solenoid 20 via logic/control connections 28 and 30 and with transmission member 16 through the mechanical coupler/shaft 14. The on-board control unit 26 may also be coupled with additional components including an engine control unit (ECU) 32 such as via a position command connection 34 and an optional feedback connection 36.

Figure 3:
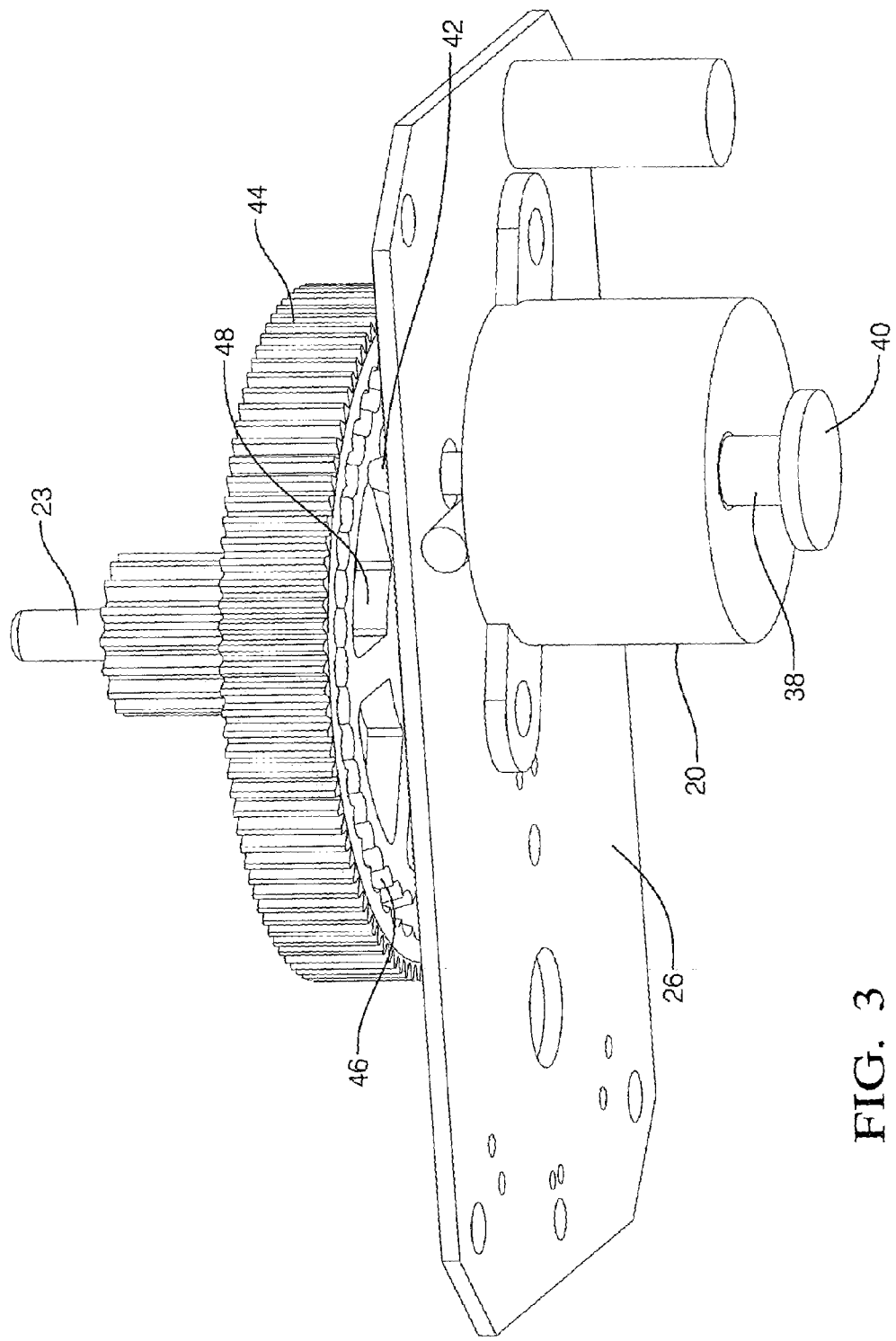
FIG. 3 is a schematic isometric illustration of details of the position lock solenoid and locking gear of the preferred embodiment of the present invention.

FIG. 3 is a schematic isometric illustration of details of the position lock solenoid 20 and locking details of a locking gear 44 in accordance with one possible embodiment of the present invention. In FIG. 3, the position lock solenoid 20 is shown having a rod-shaped member 38 (plunger) having a cap 40 and ending in an engaging tip 42. Preferably engaging tip 42 is tapered. A gear 44 of the gear train 18 includes a plurality of locking features 46 distributed along an outer circumference of the gear 44. As used herein, locking features may comprise any suitable configuration including features comprising part of, or features disposed on, the locking gear 44, provided such features are suitable for selectively engaging the locking gear 44 at a selected position and holding the locking gear 44 at the selected position for a specified period of time. For example, locking features may comprise features in other locations on the gear or on the gear teeth or on other parts of the mechanism that could be used to lock to a selected position. Locking features preferably comprise a plurality of conical shaped detents 46. However, locking features are not restricted to conical shaped detents. Other shapes to be selected and used based on requirements are anticipated as within the scope of the present invention. Gear 44 is further shown having a plurality of lightening features 48. Most preferably, the detent features 46 are located on the bottom surface of the gear 44 to eliminate potential wear on the drive teeth.

Figure 4:
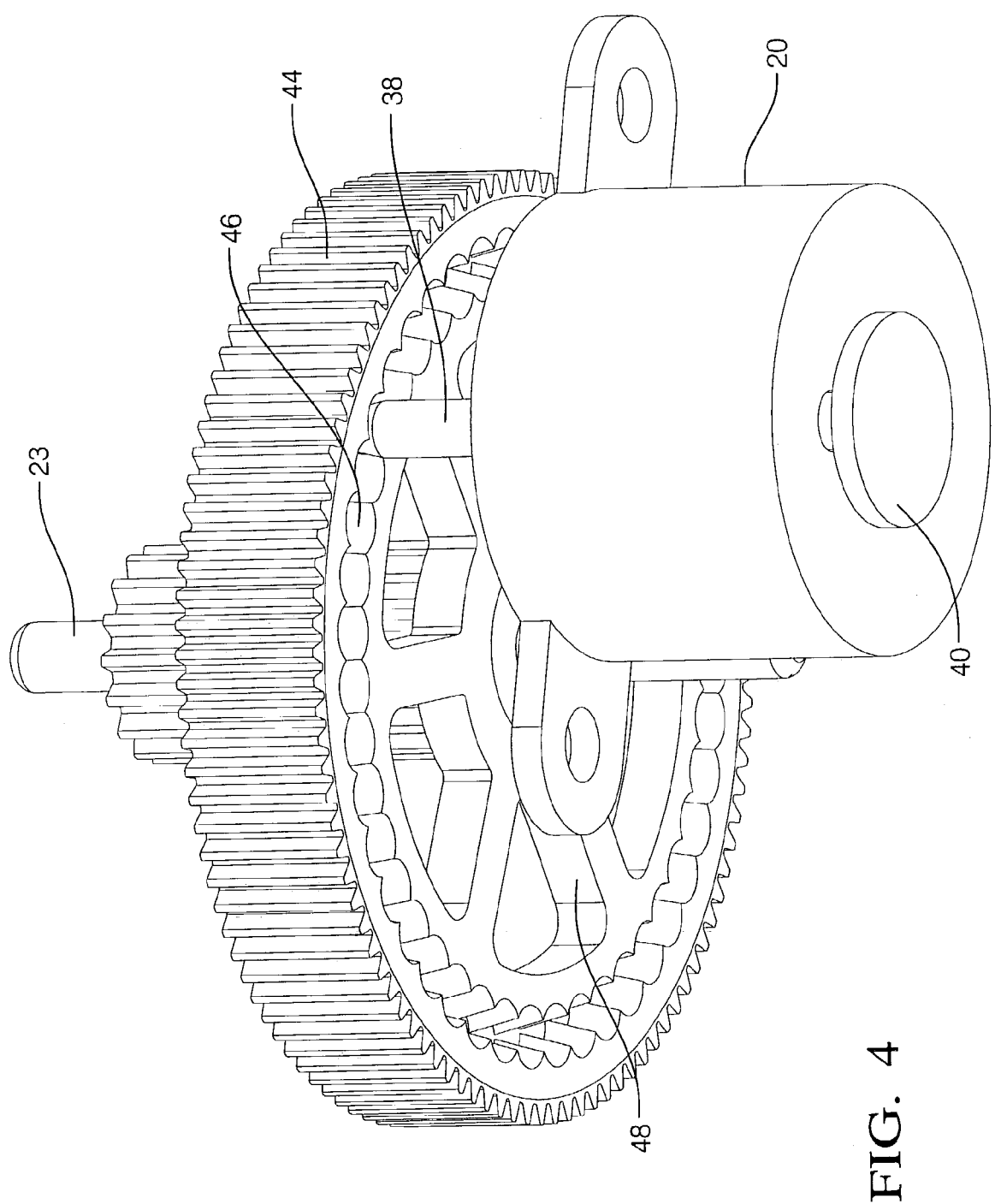
FIG. 4 is a schematic perspective illustration of the position lock solenoid showing the solenoid engaged at a selected position on the locking gear.

FIG. 4 is a schematic perspective illustration of the position lock solenoid 20 showing the solenoid 20 engaged at a selected detent position 46 on the locking gear 44. In operation, the present smart actuator 10 is adapted via structure and logic/control operating features to deliver a driving torque to the gear train 18 via the electric actuator 12. Gear train 18 is adapted to selectively convey the driving torque from the electric actuator 12 to drive the load to a selected position on the output shaft 22. The locking gear 44 rotates about the central shaft 23 causing the locking features 46 to pass by the solenoid plunger 38. Once the desired position is achieved on the output shaft 22, the position lock solenoid 20 is activated via a command from on-board controller 26 and the rod 38 moves into engagement with the gear 44 at a selected detent position 46 thereby locking the gear train 18 at the desired position. Once the position lock solenoid 20 is activated and the gear train 18 is locked, the electric actuator 12 is shut off. In this way, the present invention enables achieving and holding a high torque level without driving a lot of current. The present invention comprises a smart part including input and output logic and control software for controlling all aspects of the smart actuator 10 and associated components. Therefore, the desired position of the gear train 18 is known and the gear train 18 is held in the selected position for a specified amount of time. The gear position and hold time is selected in accordance with various data parameters including closed loop communication with an automotive ECU such as ECU 32.

Figure 5:
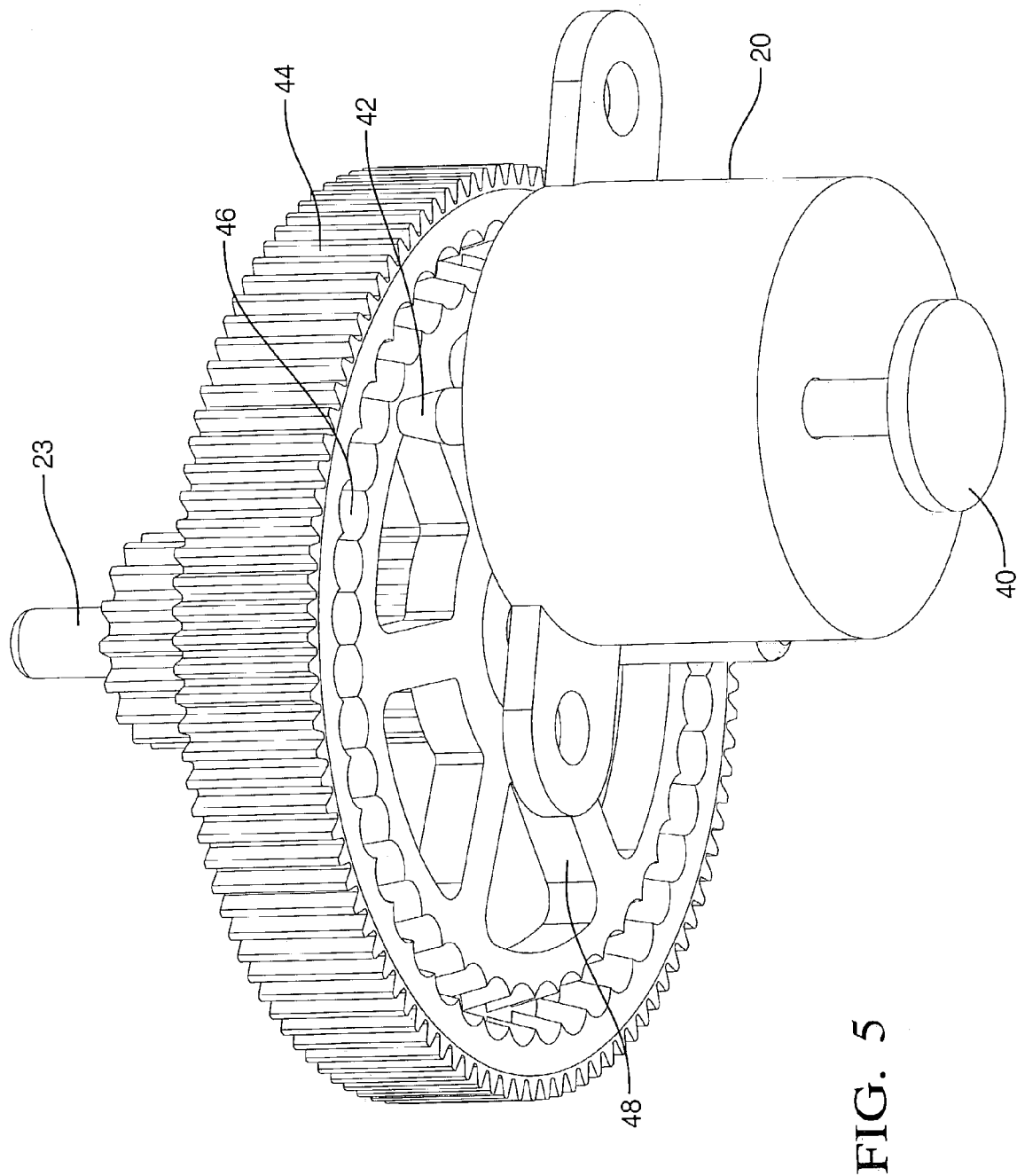
FIG. 5 is a schematic perspective illustration of the position lock solenoid showing the solenoid disengaged from the locking gear.

The logic/control aspect of the present invention further controls disengagement of the position lock solenoid 20 to reverse the gear train 18. FIG. 5 is a schematic perspective illustration of the position lock solenoid 20 showing the solenoid rod engaging tip 42 disengaged from the locking gear 44.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A smart actuator comprising:
  an actuating device adapted to deliver a selected driving torque to a gear train;
  said gear train being coupled to an output shaft and adapted to selectively convey the driving torque from the actuating device to said output shaft to achieve a selected shaft position on said output shaft;
  said gear train comprising at least one locking gear including a plurality of locking features distributed along an outer circumference of the locking gear and defining a plurality of selectively engageable gear positions;
  a position lock solenoid operable to engage said at least one locking gear in a selected gear position when said gear train achieves said selected shaft position on said output shaft, and operable to hold said locking gear at said selected gear position, thereby holding said selected shaft position; and, at least one logic and control device for operating the various aspects of the smart actuator, operable to discontinue electrical current to the actuating device after the position lock solenoid has engaged the locking gear.

2. The smart actuator of claim 1, wherein said actuating device comprises an electric actuator.

3. The smart actuator of claim 1, wherein said locking features are located on a bottom surface of said locking gear.

4. The smart actuator of claim 1, wherein said locking features comprise conical shaped detent features.

5. The smart actuator of claim 1, wherein said position lock solenoid includes a rod-shaped member having a cap at a first end and ending in a tapered engaging tip at a second end for engaging a selected locking feature on said locking gear.

6. The smart actuator of claim 1, wherein said at least one logic and control device comprises an on-board control unit.

7. The smart actuator of claim 1, wherein said at least one logic and control device is further coupled with additional logic and control devices.

8. The smart actuator of claim 1, wherein said at least one logic and control device is further coupled with an engine control unit.

9. The device of claim 1, wherein the at least one logic and control device for operating the various aspects of the smart actuator further comprises said logic and control device operable to disengage the position lock solenoid.

10. The device of claim 1, wherein the position lock solenoid operable to engage said at least one locking gear in a selected gear position when said gear train achieves said selected shaft position on said output shaft, and operable to hold said locking gear at said selected gear position, thereby holding said selected shaft position, further comprises the position lock solenoid operable to lock the gear train at the desired position when the desired position is achieved on the output shaft.

11. The device of claim 10, wherein the position lock solenoid operable to lock the gear train at the desired position comprises the position lock solenoid activated and the rod moved into engagement with the gear at a selected detent position.

12. A method for transmitting and holding a torque level employing a smart actuator comprising:

delivering a selected driving torque to a gear train via an actuating device coupled to said gear train, said gear train being further coupled to an output shaft and adapted to selectively convey the driving torque from the actuating device to said output shaft, said gear train comprising at least one locking gear including a plurality of locking features distributed along an outer circumference of the locking gear and defining a plurality of selectively engageable gear positions;

achieving a selected position on said output shaft, based upon the delivered selected driving torque;

selectively activating a position lock solenoid adapted to engage said locking gear at a selected gear position once said gear train has achieved said selected position on said output shaft;

holding said locking gear in said selected position by engaging the locking gear at the selected gear position; and, discontinuing electrical current to said actuating device after said position lock solenoid has engaged said locking gear at the selected gear position.

13. The method of claim 12, further comprising: disengaging the locking gear from the selected gear position.

* * * * *